United States Patent [19]

Cornet

[11] Patent Number: 4,577,291
[45] Date of Patent: * Mar. 18, 1986

[54] THERMO-OPTICAL DATA WRITING PROCESS AND DATA MEDIUM FOR PERFORMING THIS PROCESS

[75] Inventor: Jean Cornet, Paris, France

[73] Assignee: Thomson-CSF, Paris, France

[*] Notice: The portion of the term of this patent subsequent to Sep. 13, 2000 has been disclaimed.

[21] Appl. No.: 644,648

[22] Filed: Aug. 27, 1984

Related U.S. Application Data

[63] Continuation of Ser. No. 517,748, Jul. 27, 1983, abandoned, which is a continuation of Ser. No. 226,803, Jan. 21, 1981, Pat. No. 4,404,656.

[30] Foreign Application Priority Data

Jan. 23, 1980 [FR] France ................................ 80 01423

[51] Int. Cl.$^4$ ............................................... G11C 11/46
[52] U.S. Cl. .................................... 365/126; 369/109; 369/275; 430/348
[58] Field of Search ........................ 365/126, 120, 124; 369/100, 109, 127, 275; 346/135.1

[56] References Cited

U.S. PATENT DOCUMENTS

| | | | |
|---|---|---|---|
| 3,171,744 | 3/1965 | Peticolas et al. | |
| 3,644,014 | 2/1972 | Hirschberg | 350/3.5 |
| 3,787,873 | 1/1974 | Sato et al. | 365/126 |
| 4,004,080 | 1/1977 | Vossen et al. | 369/283 |
| 4,264,986 | 4/1981 | Willis | 365/127 |
| 4,285,056 | 8/1981 | Bell | 369/100 |
| 4,300,227 | 11/1981 | Bell | 369/100 |
| 4,404,656 | 9/1983 | Cornet | 365/126 |

FOREIGN PATENT DOCUMENTS

| | | |
|---|---|---|
| 2344233 | 3/1974 | Fed. Rep. of Germany . |
| 2441263 | 3/1976 | Fed. Rep. of Germany . |
| 2701218 | 5/1978 | Fed. Rep. of Germany . |
| 2111204 | 6/1972 | France . |
| 2145606 | 2/1973 | France . |
| 2026901 | 2/1980 | United Kingdom . |

OTHER PUBLICATIONS

Katou, abstract of Japan Patent 54-9002, 10/6/79.
Anderson, "Materials for Thermoplastic Recording by Heat Alone", IBM Tech. Disc. Bul., vol. 6, No. 12, 5/64, p. 3.
Tolle et al, "Fast Imaging in $PbI_2$ Films", Applied Physics Letters, vol. 26, No. 6, 3/15/75, pp. 349–351.
Wrobel, "Medium, Process and System for Recording Information", European Patent Application, No. 3,262, 8/8/79.

*Primary Examiner*—Terrell W. Fears
*Attorney, Agent, or Firm*—Cushman, Darby & Cushman

[57] ABSTRACT

The invention relates to thermo-optical inscription or writing on a data support comprising an organic intermediate layer (2) covered by a metal layer (3).

The invention relates to a writing process consisting of creating in the metal layer 3 a plastic deformation as a result of the gaseous pressure exerted due to the local thermal degradation of intermediate layer 2. Inscription produces a bulge-like impression without perforating the metal layer (3).

The invention more particularly applies to the thermo-optical inscription and storage of data on an optically readable support by phase or amplitude contrast.

18 Claims, 12 Drawing Figures

THERMO-OPTICAL DATA WRITING PROCESS AND DATA MEDIUM FOR PERFORMING THIS PROCESS

This is a continuation of application Ser. No. 517,748, filed July 27, 1983, abandoned, which is a continuation of 226,803, filed Jan. 21, 1981, issued as U.S. Pat. No. 4,404,656 on Sept. 13, 1983.

BACKGROUND OF THE INVENTION

The present invention relates to the thermo-optical recording of data which are to be optically read. It more particularly aims at a thermo-optical writing or inscription process using a low power laser and a thermosensitive support enabling on the one hand the reading of the data immediately following their recording without any intermediate development stage and on the other hand the copying of the data by an overall, rapid method without deterioration of the original etching or any modification of the etching characteristics during the copying process.

The structures proposed for writing data with low power lasers (typically below 15 mW) generally operate by thermal ablation. This is, for example, the case with layers of tellurium, bismuth, or vitreous chalcogenide alloy and even certain metal layers deposited on thermally degradable organic intermediate layers. The data are stored in the form of holes in said structures and during reading said holes create an amplitude contrast making it possible to detect the data. However, the data cannot be copied in an overall, simple and fast manner, for example by means of a polymerization process which forces a liquid to enter the cavity of the relief, followed by the hardening thereof by an appropriate means (thermal or photographic). This duplication method transforms the amplitude contrast of the original into phase contrast, i.e. the copies cannot be read with the same reader as that used for reading the original. A photographic or holographic method must be used to ensure that the copy retains an amplitude contrast. In this case the photographic method has serious disadvantages in that it requires an excellent contact between the emulsion and the recorded surface of the original, which is generally difficult to achieve over the entire area of the supports to be brought into contact due to dust. It is also necessary to work in a darkroom with top quality optical instruments while using emulsions with a very high resolution. However, the holographic method requires cumbersome equipment.

Other structures have been developed by the Applicant having the special feature of providing better impression characteristics, particularly from the writing sensitivity standpoint and the reading signal to noise ratio than the structures operating by thermal ablation. These structures are constituted by a ductile metal layer covering a highly expansible organic layer. The light absorption by the metal layer during impact of the laser beam leads to the heating of the organic layer which reacts to this heating by a powerful local thermal expansion without change of state. In turn this expansion creates an unreversible stretching in the metal layer, exceeding the elastic limit, but remaining this side of the elongation at break. The main disadvantage of this type of structure is that the considerable thermal expansion of the organic layer is generally obtained by adding a large quantity of plasticizer to the polymer. However, the plasticizer is a liquid which behaves like a solvent and consequently leads to a drop in the mechanical properties of the polymer, particularly its hardness and its softening point. As a result particular care must be taken during the subsequent deposition of the metal layer to ensure that no mechanical stress is introduced into the organic layer which, on relaxing, may impair the morphology of the structure, both before and after storage of the data. Therefore the metallic layer must be deposited at a very low speed, be perfectly stainless, have a limited hardness, a limited mechanical rigidity and limited adhesion to the organic layer. As a result the data medium is difficult to manipulate without special precautions. In addition, the deposition of a random protective layer (thermosetting or photo-hardenable resin, varnish, etc.) is not possible, because it systematically leads to stresses which may denature the recorded impression. The only acceptable protection system is the use of a cap leaving a free space above the sensitive layer. However, this cap virtually doubles the cost of the data medium. Finally there is no possibility of using direct duplication by polymerizable liquid or contact photography for producing copies from such a fragile structure.

BRIEF SUMMARY OF THE INVENTION

The invention relates to a thermo-optical data writing process consisting of the surface heating by means of an intensity-modulated, focused radiation beam of a thermosensitive data medium having at least one metal layer covering an organic intermediate layer, wherein the thermal energy given off in the metal layer by the impact of the beam causes gas evolution by local degradation of the organic intermediate layer, this gas evolution and the associated loss of adhesion lead to stretching in the metal layer beyond the elastic limit and on this side of the elongation at break of the ductile material constituting said metal layer.

The invention also relates to a data medium incorporating an organic intermediate layer covered by at least one metal layer wherein the localized heating of the metal layer in the impact area of a focused radiation beam produces a gas evolution by local degradation of the organic intermediate layer, this gas evolution and the resulting loss of adhesion bring about a plastic stretching of the metal layer which is beyond the elastic limit and on this side of the elongation at break of the ductile material constituting the metal layer.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
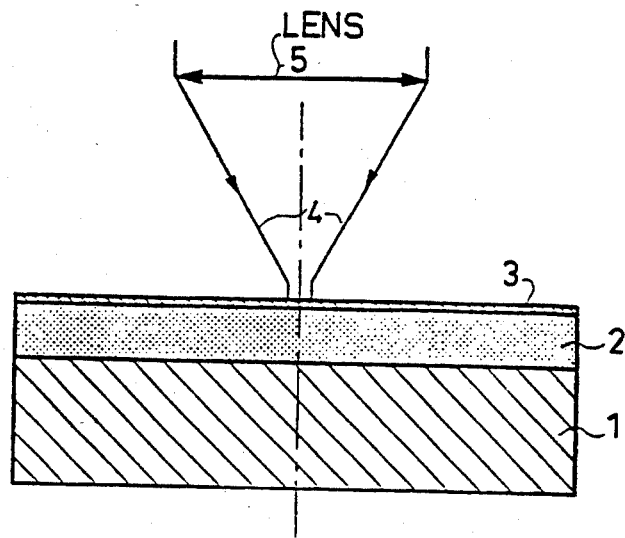
FIG. 1 a thermosensitive data medium and a focused, optical writing beam.

FIG. 1 is a sectional view of a data medium which can be thermo-optically inscribed by means of the radiated energy contained in an inscription or writing beam 4 focused by a lens 5. The data to be written is generally in the form of an angularly modulated electrical signal. This signal modulates the intensity of beam 4, for example by means of an electrically controlled optical modulator not shown in FIG. 1. The radiated energy is produced by a coherent light source in order to obtain a very small spot by focusing on the surface of the data medium. When the spot moves on the surface of the medium in a direction perpendicular to the plane of FIG. 1 a relief impression is formed and has the configuration of a succession of protuberances of non-uniform length and spacing. This relief materializes a track, whose phase contrast can be optically read. There can be an amplitude contrast when the relief obtained leads to a thickness reduction of the structure of the medium, because this mechanical effect resulting from a stretching of the thin layer leads to a variation in the transmittance or optical reflectance.

The thermosensitive medium of FIG. 1 comprises a substrate 1 covered by an intermediate layer 2 of organic material, which is in turn covered by a metal layer 3.

Figure 2:
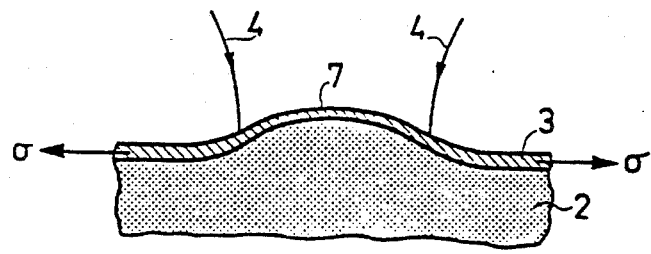
FIG. 2 a deformation of the medium of FIG. 1 during the writing phase.
Figure 3:
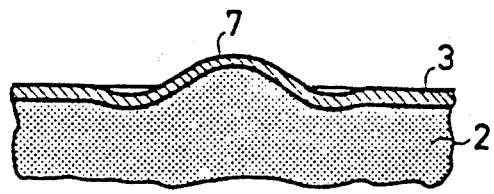
FIG. 3 the relief obtained on the surface of the medium of FIG. 1 in the case of an inscription made without perforation or change of state.

Under the impact of the writing beam 4, the metal layer 3 is locally heated due to the absorption of the radiated energy and tranfers this heating to the intermediate layer 2. FIG. 2 shows the appearance of the data medium surface as a result of the heating of the intermediate layer 2. When this heating causes no change of state either in layer 3 or in intermediate layer 2, it is possible to obtain a permanent impression after the passage of the writing beam 4 on the basis of an expansion of the bulge or swelling 7 of intermediate layer 2, which causes a stretching $\sigma$ in layer 3 which is beyond the elastic limit. The residual deformation obtained is illustrated in FIG. 3. The relief impression has in its centre a bulge 7 and the latter is linked with the non-deformed portions of layer 3 by a small annular depression resulting from the rebalancing of stresses. It can be seen in FIG. 3 that the organic material of the intermediate layer 2 remains in contact with layer 3. The deformation without change of state described hereinbefore is compatible with a low writing beam power and makes it possible to obtain an impression which can be easily read when using a highly plasticized polymer in intermediate layer 2. To increase the permanent deformation, bearing in mind the limited adhesion of layer 3 to intermediate layer 2, the metal used has a limited hardness. As a result the data medium produced in this way is completely devoid of mechanical strength. Moreover, the deposition of layer 3 on intermediate layer 2 must be performed at a slow speed so as to prevent any stress liable to cause folds. The structure using a soft layer deposited on a highly plasticized polymer intermediate layer undergoes perforation on reaching the power threshold $E_V$ at which the intermediate layer is degraded. The perforation of layer 3 leads to the appearance of an edge with difficultly reproducible contours, which reduces the signal to noise ratio of the read-back signal of the impression.

Figure 4:
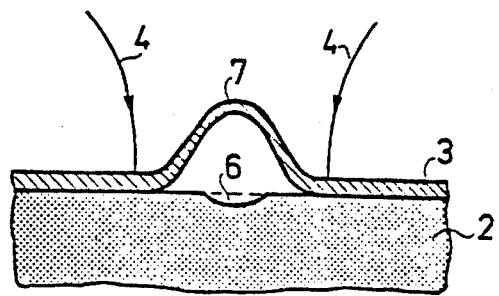
FIG. 4 the relief obtained on the surface of the medium of FIG. 1 in the case of an inscription performed according to the invention.

According to the invention for obtaining a relief impression without perforation of layer 3 and which has better mechanical strength, a metal is chosen which has a better adhesion to intermediate layer 2 and an unplasticized or only slightly plasticized polymer material is adopted for the latter. Stretching beyond the elastic limit of layer 3 is largely due to the formation of a gas bubble obtained by local degradation of the intermediate layer 2. The impression produced in this way is shown in FIG. 4, where it is possible to see that layer 3 has disengaged from intermediate layer 2 due to the local degradation of layer 2 with the formation of crater 6.

Figure 5:
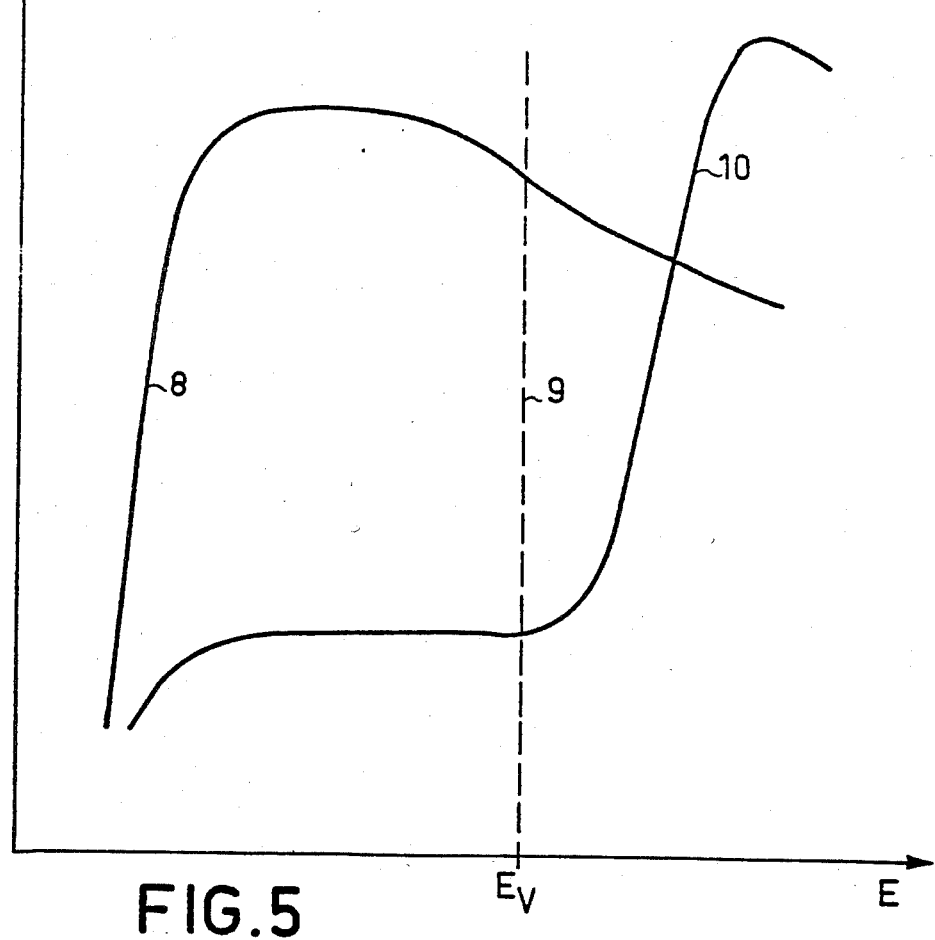
FIGS. 5 and 6—explanatory diagrams.

The diagram of FIG. 5 illustrates the response characteristics of the two types of data medium referred to hereinbefore. They differ by their sensitivities to the inscription radiation and by their mechanical strength values. The writing beam power E is plotted on the abscissa and the signal to noise ratio which can be obtained by reading the impression on the ordinate. In the case of a data medium constituted by a highly plasticized polymer intermediate layer 2 covered by a relatively soft, moderately adhering, precious metal layer 3, the response characteristic 8 is obtained. On this side of the power threshold $E_V$ leading to a degradation of intermediate layer 2, i.e. to the left of dotted line 9, it is clear that an easily readable impression can be obtained with a limited inscription power. Beyond the degradation threshold $E_V$ the characteristic 8 is bent, because the degradation of the intermedate layer 2 leads to the inevitable perforation of metal layer 3.

The response characteristic 10 relates to a data medium according to the invention having a reduced sensitivity to the inscription, which has a better mechanical strength. This support has an intermediate layer 2 which is unplasticized or only slightly plasticized and a metal layer 3, which is harder and more adhesive due to the incorporation of an appropriate element. The part of characteristic 10 to the left of line 9 indicates a low reading signal to noise ratio, because the relief of the impression is much more marked than in the case of the data medium to which characteristic 8 refers. This results from the lower expansion coefficient of the polymer and the raising of the elastic limit of the metal layer 3.

Figure 6:
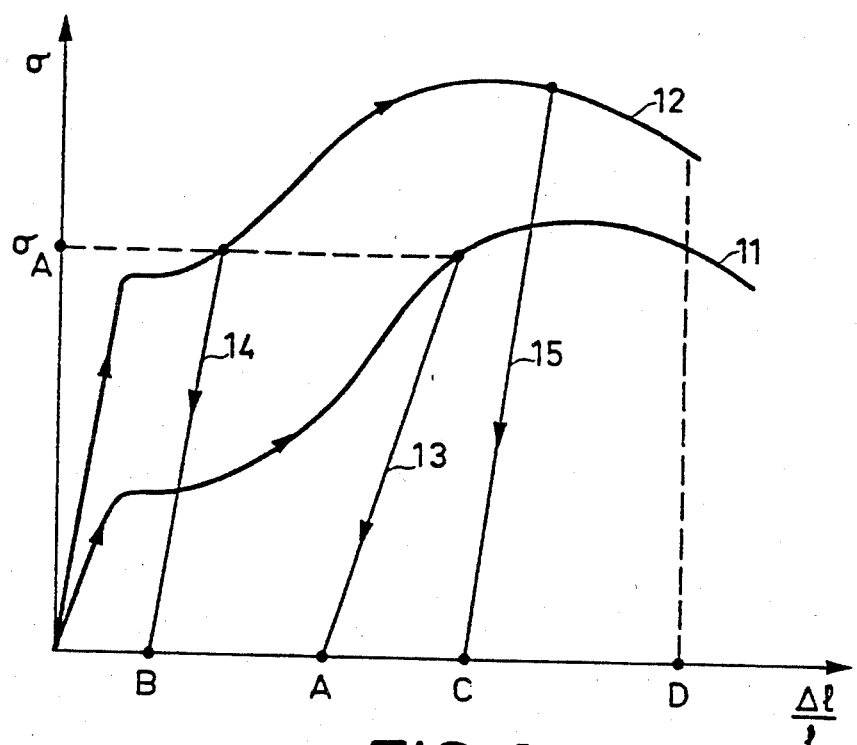

FIG. 6 makes it possible to compare the elongation-tension curves of metals constituting layer 3 of the two types of data medium having respectively the response characteristics 8 and 10 of FIG. 5. The proportional elongation is plotted on the abscissa of FIG. 6, whilst the mechanical tension $\sigma$ is plotted on the ordinate.

Curve 11 relates to a soft metal layer produced from a precious alloy without adjuvant. A significant stretching beyond the elastic limit can be obtained with a mechanical tension $\sigma_A$. At A the discharge line 13 encounters the zero tension axis, so that a significant impression relief is ensured because the permanent elongation OA is considerable. Such a stretching justifies the good signal to noise ratio obtained, despite the lack of degradation of intermediate layer 2 in the case of characteristic 8 of FIG. 5.

Curve 12 relates to a much harder metal layer 3. The same mechanical tension $\sigma_A$ only just exceeds the higher elastic limit and the discharge line 14 shows that plastic stretching has given rise to a limited permanent elongation OB. This situation corresponds to the part of characteristic 10 in FIG. 5 to the left of line 9. According to the invention use is made of that part of characteristic 10 to the right of line 9. The degradation of the intermediate layer 2 leads to the local disengagement of the metal layer 3 and the volume of gas given off leads to a supplementary plastic stretching, which may remain on this side of the elongation at break OD of the metal layer. Thus, along the discharge line 15 there is a permanent elongation OC guaranteeing an excellent reading signal to noise ratio, as illustrated by the part of the characteristic 10 to the right of line 9.

The diagrams of FIGS. 5 and 6 show that by utilizing a plastic stretching without perforation of the metal layer 3, the procedure is different level with intermediate layer 2 because the latter causes stretching either by expansion without change of state, or by local thermal degradation supplying most of the deformation work of the metal layer.

According to the writing process according to the invention the impression of FIG. 4 is obtained, whose significant relief is produced due to the thermal degradation of the organic intermediate layer 2 and its maintainance corresponds to plastic stretching without perforation of the metal layer 3.

The data medium suitable for performing the writing process has an intermediate layer 2 of a thermally degradable organic material with a thickness of approximately 10 to 300 nm. Layer 2 is covered with a thin metal layer 3 with a thickness of 5 to 10 nm. Substrate 1 can be of a random nature, i.e. metallic, vitreous or organic, opaque or transparent, flexible or rigid and of a random thickness. As a non-limitative example substrate 1 is transparent and rigid and has a thickness between 1 and 1.5 nm. The organic intermediate layer 2 is preferably chosen with a low degradation temperature, a high hardness and a limited compressibility in such a way that the deformation resulting from the degradation of the polymer remains confined to the laser beam impact area. The metal layer 3 fulfils several functions. It serves to absorb the incident radiation for converting it into thermal energy. Under the impact of the laser it must also confine the bubble created by the degradation of the polymer, which implies that it is completely continuous (without cracks, craters, etc.) and must adhere firmly to the organic intermediate layer. Finally it must have high ductility and hardness, so that it undergoes a significant deformation under the pressure created by the gas bubble, without there being any type of fracture or perforation. In view of the fact that the deformation can be of a very considerable level (up to approximately 300 nm) without the formation of any hole or bulge, a very good signal to noise ratio is obtained during readout. The writing process by degradation can be used on almost all thermoplastic polymers which can be degraded at low temperature.

However, when making the choice account must be taken of the ease of thin layer or semi-thick layer deposition on large surfaces, the microscopic quality of the layer, i.e. its continuity, absence of graining or other defects, as well as its transparency and adherence to the substrate. As a non-limitative example it is possible to use for the organic intermediate layer 2 polymethyl methacrylate, polystyrene, polycarbonates, polysulphone or cellulose derivatives (nitrocellulose, cellulose acetate, ethyl cellulose, celluse acetobutyrate). In certain cases these substances are commercially obtainable in the form of thin or thick sheets, so that the actual substrate 1 acts as the thermally degradable layer. In all cases these substances can also be deposited on a substrate 1 by drawing or centrifuging from solutions in simple solvents (acetone, cyclohexanone, butyl acetate or the mixture of solvents known under the trade name "AZ Thinner" of the SHIPLEY company). Other deposition methods can also be used, such as vacuum sublimation or cathodic sputtering. Moreover, it may be advantageous to add to the polymer an adjuvant able to reduce the temperature at which gaseous emission occurs, i.e. improving the sensitivity. This is the case with certain plasticizers such as adipates, azelates and sebacates of isodecyl, butoxyethyl or ethylhexyl or isodecyl, cyclohexyl or ethylhexyl phthalates.

For producing the metal layer 3, the metals are chosen as a function of their ductility, their deformation shock resistance, their hardness, their limited oxidizability and their possibility of being used in the production of perfectly continuous thin layers which will adhere to the polymer. The ductility and shock resistance are generally obtained with gold, silver or platinum-based alloys in the homogeneous phase. The hardness and adhesion are obtained by choosing as the addition element one of the following elements Cu, Cr, Ni, Al, Sb, Ta, Ti, Mn, Si, Zr, Co, Pd provided that the precious metal content exceeds or is equal to 60% by weight, so that the alloy retains a good oxidation resistance and remains in the high ductility homogeneous phase. It is therefore possible to use the dental alloys Ag-Pd-Cu. Moreover, other addition elements can be used without passing beyond the scope of the invention. It is also possible to use non-precious alloys such as aluminum bronzes (e.g. $Cu_{70}$, $Fe_{7.5}$, $Al_{22.5}$) or tin bronzes (e.g. $Cu_{70}$, $Sn_5$, $Pb_{25}$) and Cu-Ni, Cu-Pd and Ni-Pd alloys, which are known to have a high oxidation resistance, as well as interesting mechanical properties for the purpose of the present invention. As a non-limitative example the Applicant has obtained excellent results with the alloy $Cr_{20}Au_{80}$ (by weight). All these metals make it possible to produce thin layers by vacuum evaporation and these layers have a known absorption power of 50% for incident radiation when the thickness of the layers is between 4 and 10 nm. Moreover, annealing in an oxidizing atmosphere (e.g. at 55° C. for 48 hours) makes it possible in certain cases, e.g. that of Cu-Au alloys, to considerably increase the hardness and adhesion of the metal layers without significantly reducing their ductility.

One of the advantages of the invention is that the adhesion of the metal layer to the polymer and the existence of a significant radial thermal gradient tends to confine the gas bubble to the centre of the writing or inscription spot, i.e. gives a much smaller deformation than that of the said spot. In fact it can be as small as 0.3 $\mu$m, whilst leading to a signal to noise ratio above 50 db. This leads to a transfer function with a cut-off frequency rejected at high frequency. In addition, the size of the inscription and the signal to noise ratio rapidly vary as a function of the power of the inscription beam, as is shown by characteristic 10 of FIG. 5. This provides the possibility of storing the data at several levels by regulating the power (the only limitation being the available power, because holes are never formed).

In addition, the effect of reducing the thickness of the metal layer as a result of its plastic deformation can be utilized for reading the data contained in the impression by local reflectance reduction and by a correlative transmission increase. Thus, there is an amplitude contrast which completes the phase contrast associated with the relief of the impression. Although the thickness of the metal layer is limited, its hardness and the mechanical rigidity of the polymer make it easy to manipulate the latter medium by using only elementary precautions, particularly for providing protection against dust and fingermarks. Thus, the structure has a long service life. However, it may be advantageous to more completely protect the data contained in the sensitive layer.

Figure 11:
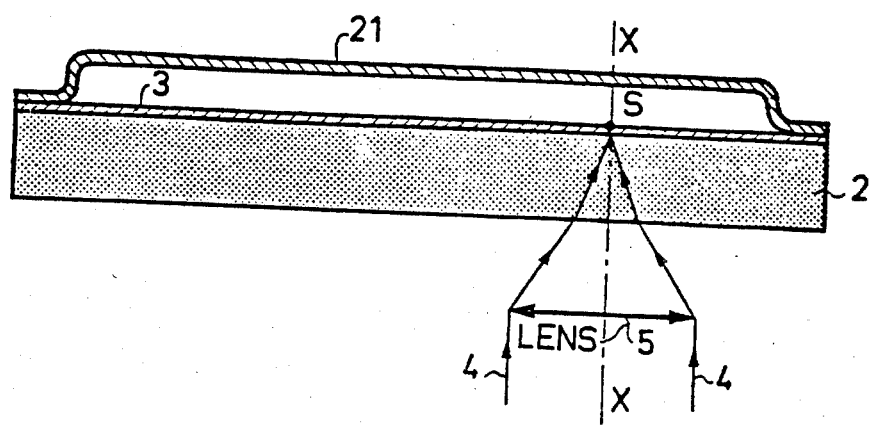
FIG. 11 the protection by means of a cap of the data medium according to the invention.

FIG. 11 shows a conventional construction of this protection using a cap 21 giving an empty space above the metal layer 3. The inscription can be made by means of a light beam 4 traversing the substrate, here in the form of the intermediate layer 2 and focused on the metal layer 3 by a lens 5 of optical axis XX. The protective cap 21 can be transparent to the inscription radiation and the substrate can be opaque if read-out is by reflection. For read-out by transmission, the two elements giving access to the metal layer 3 must be transparent to the read-out radiation.

Figure 7:
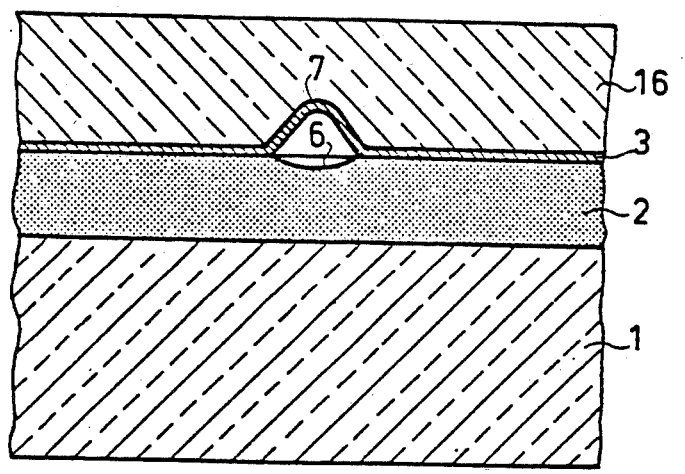
FIG. 7 a first variant of the data medium according to the invention.

However, simpler and less onerous protective methods can be used. As shown in FIG. 7 the sensitive layer 3 can be protected without being degraded in any way by means of a thick layer 16 of photo-polymerizable or thermo-polymerizable resin, a varnish or a polymer deposited by the wet method (drawing, centrifuging, etc.) or by the dry method (sublimation, cathodic sputtering). This layer 16 can be deposited both before and after inscription to the extent that its hardness is not so high that it opposes the growth of the deformation under the impact of the laser beam. As a non-limitative example layer 16 is of thermosetting silicone of type Sylgard 184 produced by Dow Corning Company, a photopolymerizable, acrylic laquer or a nitrocellulose coating deposited by centrifuging from a solution of 100 g/l of AZ Thinner of the Shipley Company. It should be noted that the thick layer protection described here is effective not only in protecting the sensitive layer 3 from possible mechanical damage, but also protects it against corrosion if 3 is not completely stainless, which is the case with Cu-Au alloys with a very high copper content.

Figure 8:
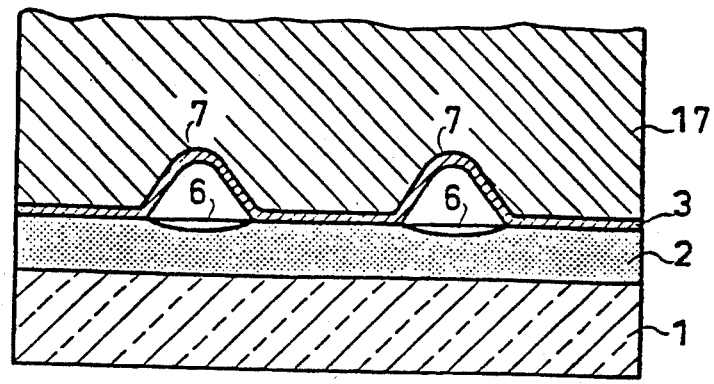
FIG. 8 a data medium reinforced by an electrolytic deposit according to the invention.
Figure 9:
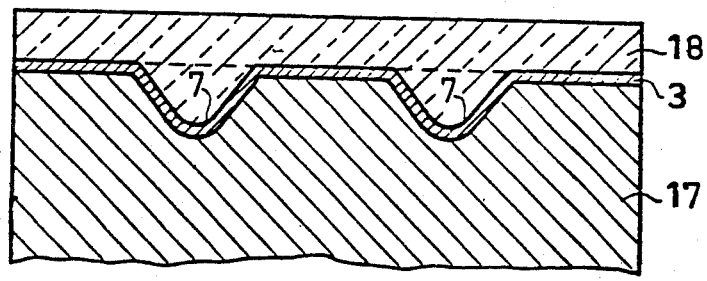
FIG. 9 The aspect of the metal protection of FIG. 8 after renewal of the elements of the radiation-transparent medium.

FIG. 8 shows another protective method consisting of depositing a metal layer 7 on the recorded data medium. This deposit can be produced on metal layer 3 by the electrolysis of a metal with a high mechanical and chemical strength, e.g. nickel. Unlike structures etched by ablation, the structure according to the invention can be covered with a thick metal layer 17 without the relief disappearing, because it is still legible through substrate 1. The configuration defined by the data medium protected by a thick metal layer 17 according to the invention is a structure which is particularly satisfactory when a long-term storage is desired. It should also be noted that a degradation of substrate 1 is not prejudicial to the reading of the data because the damaged substrate and the intermediate layer 2 can be removed by dissolving in a suitable solvent and can be replaced by a new protective layer 18, e.g. a photopolymerizable resin, as illustrated in FIG. 9.

During this operation the etching on the thick metal layer 17 is not damaged. Prior to storage in accordance with the process described hereinbefore, the relief can be copied once or several times by a contact process.

Figure 10:
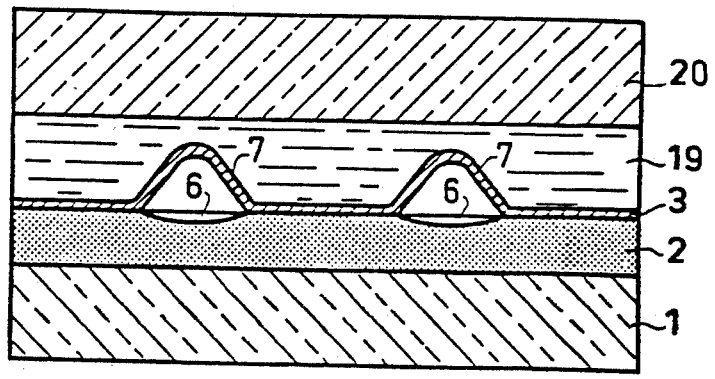
FIG. 10 the duplication process applicable to the recorded medium according to the invention.

FIG. 10 illustrates the general copying process by etching by means of a photopolymerizable or thermopolymerizable liquid 19. The copy can be produced on a rigid or flexible plastic support 20. In the copying operation the data medium is coated with liquid 19, then the support 20 of the copy is engaged with the liquid coating 19 by means of a device making it possible to obtain a continuous liquid film without gas bubbles or other defects, which also has a uniform thickness. Following irradiation with an ultraviolet lamp in either direction or following thermal treatment, the polymerizable resin 19 adheres in preferred manner to the support 20. This permits a complete separation of copy 19, 20 from original 1-2-3 without any damage occurring to the copy or to the original and the latter can be used again either for complementary inscription or for a new copy.

A typical data medium according to the invention can, for example, have the following characteristics. Substrate 1 is formed by a polymethyl methacrylate disk of diameter 356 mm and thickness 1.5 mm. This substrate 1 is covered with a nitrocellulose intermediate layer 2 of thickness 500 nm deposited by centrifuging at a speed of 6 revolutions $s^{-1}$ from a solution containing 8 g of nitrocellulose per liter of AZ Thinner. After evaporating the solvent the organic intermediate layer 2 is covered with a layer 3 of an alloy $Cr_{20}Au_{80}$ (by weight) with a thickness of approximately 8 nm by vacuum evaporation at a speed of 0.3 nm $s^{-1}$. The inscription of the recording medium is carried out through the substrate 1 with a beam from a helium-neon laser ($\lambda=633$ nm) modulated at the frequency of 2 MHz. The projecting lens used has a numerical aperture of 0.45. The disk is rotated at a speed of 25 revolutions $s^{-1}$ and the inscription is made over a radius of 130 mm, leading to a succession of impressions 0.4 $\mu$m wide and 2.5 $\mu$m long, with a high relief of 150 nm when the incident power is 8 mW. Using such a recorded medium the read-out signal measured with the spectrum analyzer and related to the optical noise is at a level of 64 dB for a 30 KHz band. The relief can be copied by photopolymerization of an acrylic liquid on a rigid polymethyl methacrylate support 20 by means of a 100 W UV lamp located at a distance of 18 cm. The radiation time is 12 seconds. Read-out on a conventional machine revealed no degradation of the read-out signal, either for the original or for the copy.

Figure 12:
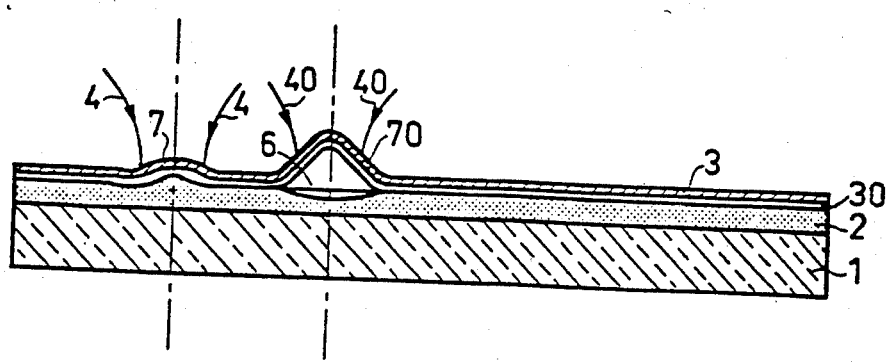
FIG. 12 another variant of the data medium according to the invention.

FIG. 12 shows a variant of the data medium according to the invention. Substrate 1 carries a plasticized organic intermediate layer 2 successively covered by a metal intermediate layer 30, e.g. of gold, which is in turn covered by a harder metal layer 3. The intermediate layer 30 makes it possible to obtain low stresses during deposition on a relatively highly plasticized organic intermediate layer 2. Thus, metal layer 3 can be deposited whilst taking fewer precautions. Such a structure makes it possible to envisage a two-phase etching process. In the first phase a continuous relief impression materializing a pretrack is produced by means of an inscription beam 4 which does not degrade the intermediate layer 2. In the second phase the relief 7 of this pretrack is inscribed with a beam 40 modulated by the data, which amplifies it due to the degradation of intermediate layer 2. Thus, a succession of protuberances is obtained having a more marked relief 70 than that of the pretrack. The production of a pretrack by degradation of the intermediate layer 2 is also compatible with the subsequent inscription of the data.

The use of a pretrack can be conceived in two different ways. It is possible to record the data on a track at the side of the pretrack or it can be recorded above the pretrack. The pretrack may involve a slight deterioration of the organic intermediate layer or an expansion without any change of state of the said intermediate layer.

Although in the foregoing description and in the subsequent drawings the essential characteristics of the present invention have been described and represented in connection with preferred embodiments thereof, it is obvious that all appropriate modifications can be made thereto without passing beyond the scope of the invention. In particular the deposition of a very thin layer of a few nm of chrome, nickel, platinum or copper on the sensitive layer 3 before or after etching with a view to increasing the hardness of layer 3 and consequently the number of copies obtainable from the same original does not pass beyond the scope of the invention. In addition, the metal layer 3 can advantageously be formed by one of the following alloys:

| Elements | Example |
|----------|---------|
| Cd—Sb    | $Cd_{18}Sb_{82}$ |
| Mg—Sb    | $Mg_{17}Sb_{83}$ |
| Al—Sb    | $Al_{33}Sb_{67}$ |
| Cd—Cr    | $Cd_{17}Cr_{83}$ |
| Mg—Cr    | $Mg_{17}Cr_{83}$ |
| Al—Cr    | $Al_{33}Cr_{67}$ |

What is claimed is:

1. A thermo-optical data writing process using a focused radiation beam intensity modulated to write in data in the form of topographic features protruding from portions of the recordable surface of a recording medium at which the impact of said beam produces a sharply focused illumination, said process comprising the steps of:

forming said recording medium of a layer of organic material undergoing thermal degradation above a predetermined temperature threshold with production of gas, said layer being flanked on one side with a thermal triggering layer of a ductile material wherein said topographic features are permanently recorded as a result of local evolution of said gas and loss of adhesion between said layers causing plastic stretching of said ductile metal below its elongation at break, said recording surface corresponding to said thermal triggering layer, said organic material layer being further flanked on its other side with supporting means not liable to substantially reflect radiation impinging from said thermal triggering layer;

using an intermediate metal layer for firmly affixing said thermal triggering layer to said layer of organic material; and causing said beam to strike said thermal triggering layer to selectively trigger said thermal degradation from a heating consisting in the direct conversion of an amount of radiant energy from said focused radiation beam to produce, once optically absorbed, enough localized surface heating of said organic material layer to raise the temperature above said threshold thereby providing said topographic features in accordance with said thermal degradation.

2. A thermo-optical data writing process using a focused radiation beam intensity modulated to write in data in the form of topographic features protruding from portions of the recordable surface of a recording medium at which the impact of said beam produces a sharply focused illumination, said process comprising the steps of:

forming said recording medium of a layer of organic material undergoing thermal degradation above a predetermined temperature threshold with production of gas, said layer being flanked on one side with a thermal triggering layer of a ductile metal wherein said topographic features are permanently recorded as a result of local evolution of said gas and loss of adhesion between said layers causing plastic stretching of said ductile metal below its elongation at break, said recordable surface corresponding to said thermal triggering layer which is firmly affixed to said layer of organic material, said organic material layer being further flanked on its other side with supporting means not liable to substantially reflect radiation impinging from said thermal triggering layer; and causing said beam to strike said thermal triggering layer at localized areas to produce, once optically absorbed, enough localized surface heating of said organic material layer to raise the temperature above said threshold thereby providing said topographic features in accordance with said thermal degradation.

3. A writing process according to claim 1 wherein the organic intermediate layer is formed from a thermoplastic polymer serving as the substrate.

4. A writing process according to claim 1, wherein two writing phases follow one another to produce a first permanent relief and, while being guided by the latter, establishing a second permanent relief.

5. A writing process according to claim 1, wherein the thermal triggering layer is reinforced by a deposit following inscription.

6. A writing process according to claim 5, wherein this deposit is an electrolytic deposit of adequate thickness to serve as a definitive support for the metal layer.

7. A writing process according to claim 6, wherein the intermediate layer and its original support are removed and replaced by a protective layer.

8. A writing process according to claim 1, wherein, after inscription, the thermal triggering layer servces for the transfer of an impression, which is carried out by means of a fluid photopolymerizable material layer.

9. A writing process according to claim 1, wherein the single sided impact in the thermal triggering layer, is protected by a cap.

10. A data medium according to claim 1, wherein the organic layer is constituted by at least one polymer, the thermal triggering layer being formed by an alloy incorporating precious metals from the group gold, silver, platinum and an adjuvant for increasing the adhesion thereof with respect to the organic layer and the deformation shock resistance, said adjuvant being chosen from among the following elements: copper, chrome, nickel, aluminium, antimony, tantalum, titanium, zirconium, cobalt, palladium, manganese, silicon.

11. A data medium according to claim 1, wherein the organic layer is constituted by at least one polymer, the thermal triggering layer being constituted by one of the following alloys: aluminium bronze, tin bronze, copper-nickel, copper-palladiumm, nickel-palladium, cadmium-antimony, magnesium-antimony, aluminium-antimony, cadmium-chrome, magnesium-chrome and aluminium-chrome alloys.

12. A data medium according to claim 1, wherein the polymer belongs to the group including polymethacrylates, polycarbonates, polystyrene, cellulose derivatives and polysulphone.

13. A data medium according to claim 12, wherein the polymer is plasticized so as to reduce its degradation temperatures.

14. A data support according to claim 13, wherein the plasticizer incorporated into the polymer is an adipate, azelate or sebacate of isodecyl, butoxyethyl or ethylhexyl or an isodecyl, cyclohexyl or ethylhexyl phthalate.

15. A writing process as claimed in claim 2, said process avoiding double transit of said beam across said thermal triggering layer.

16. A data medium according to claim 15, wherein protective means are provided for the thermal triggering layer.

17. A data medium according to claim 16, wherein these means comprise a thick electrolytic deposit of metal made after writing the data.

18. A data medium accoding to claim 15, wherein the thermal triggering layer is covered with a metal deposit which cooperates with the latter to form a resistant impression.

* * * * *